UNITED STATES PATENT OFFICE.

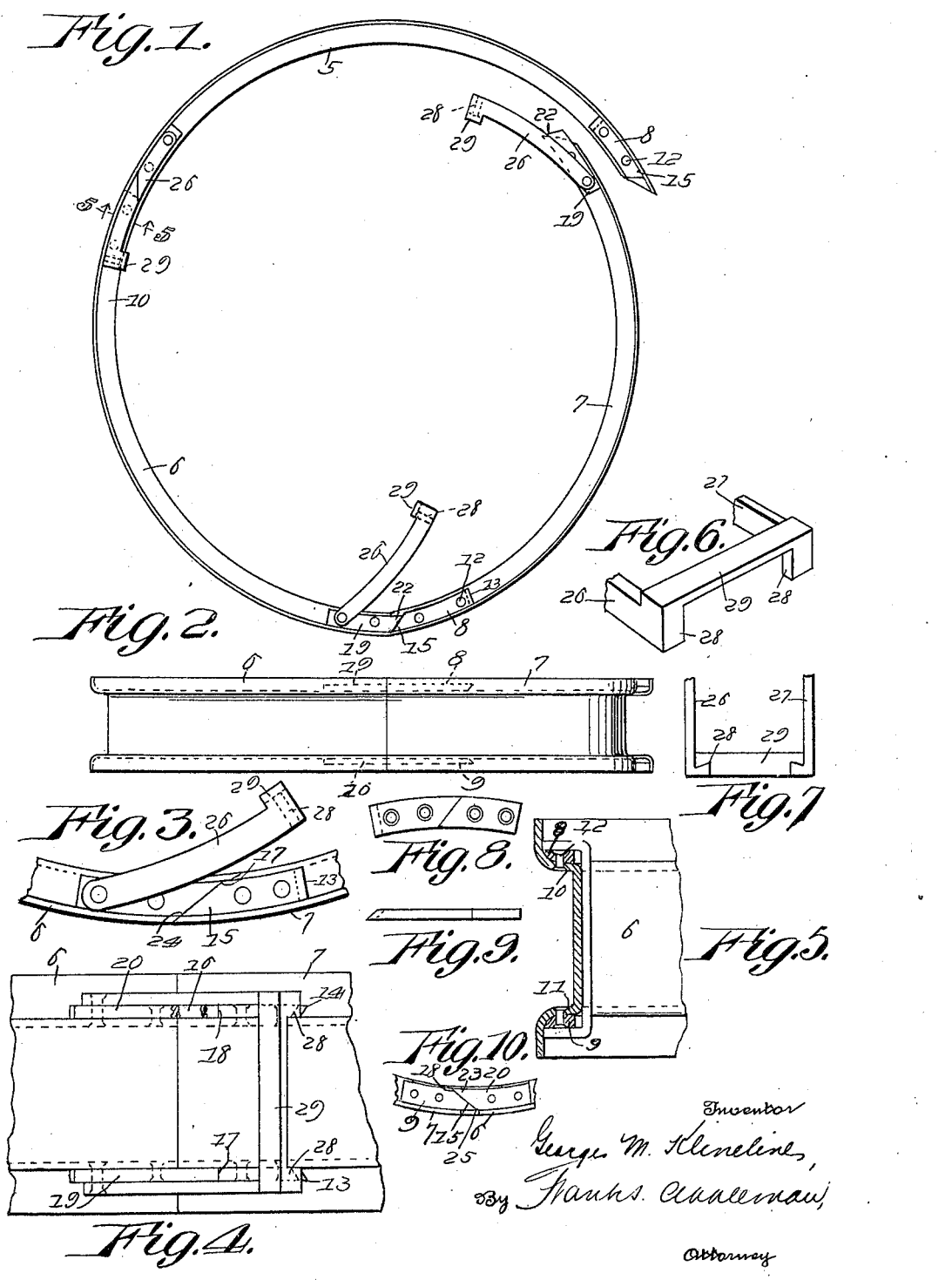

GEORGE M. KLINELINE, OF HARRISBURG, PENNSYLVANIA.

DEMOUNTABLE RIM FOR VEHICLE WHEELS.

1,404,864.  Specification of Letters Patent.  Patented Jan. 31, 1922.

Application filed December 4, 1920. Serial No. 428,347.

*To all whom it may concern:*

Be it known that I, GEORGE M. KLINELINE, a citizen of the United States of America, and resident of Harrisburg, in the county of Dauphin and State of Pennsylvania, have invented certain new and useful Improvements in Demountable Rims for Vehicle Wheels, of which the following is a specification.
This invention relates to demountable rims for vehicle wheels and more particularly for automobiles, the said invention having for its object the provision of novel means whereby sectional rims are provided with novel interlocking joints and provided with novel means for holding the joints in locked position, the said means for holding the joints in locked position being readily manipulated for causing the engagement and disengagement which results in holding the joint against breaking or disconnecting, or releases it according to the direction of movement imparted to the locking mechanism by the operator.
A still further object of this invention is to produce interlocking elements, which upon impairment of function, may be renewed comparatively inexpensively; and the invention furthermore contemplates the provision of means whereby the parts are assembled in operative relation to a rim in a manner to protect the interlocking elements from impact with projecting portions of road beds or the like.
With the foregoing and other objects in view, the invention consists in the details of construction, and in the arrangement and combination of parts to be hereinafter more fully set forth and claimed.
In describing the invention in detail, reference will be had to the accompanying drawings forming part of this specification wherein like characters denote corresponding parts in the several views, and in which—

Figure 1 illustrates a view in side elevation of a sectional rim having joint connections and locking elements embodying the invention;
Figure 2 illustrates a sectional view on the line 2—2 of Fig. 1;

Figure 3 illustrates a plan view of the inner surfaces of fragments of rim sections showing the locking device applied thereto;

Figure 4 illustrates a view in elevation of a slightly modified form of interlocking plate.

Figure 5 illustrates a sectional view near one end of one of the sections;

Figure 6 illustrates a perspective view of a fragment of the joint locking member;

Figure 7 illustrates an underneath plan view thereof;

Figure 8 illustrates a view in elevation showing the joint plates in elevation, with the locking means omitted;

Figure 9 illustrates an edge view thereof; and

Figure 10 illustrates the locking plates having a slightly different joint.

In these drawings 5, 6 and 7 denote the sections of a demountable rim, although, of course, the sections may be increased or diminished in carrying the invention into practice without departing from the invention. As the joints between the contiguous ends of adjoining sections are identical, a description of the means for connecting and holding the sections together at one joint, will suffice for an understanding of the construction of the other connecting elements.

One of the sections has side plates 8 and 9 secured to the sides of the flanges 10 and 11 respectively by fastenings 12 such as rivets. The plates 8 and 9 each have flanges or lugs 13 and 14 respectively, at the end remote from the joint, and the plates have beveled edges 15 and 16 respectively.

The contiguous rim section has plates 19 and 20 on the side flanges secured to the rim section by fastenings 21 such as rivets, and the said plates 19 and 20 have beveled edges 22 and 23 respectively. The beveled edges of the plates on one end of the rim section engage the beveled edges on the plates of the contiguous section as fully shown in the drawing and form a camming action, although under certain conditions they may be differently contoured.

As a means for retaining the interengaging plates against displacement under service conditions, means are provided for preventing the accidental breaking or unlocking of the joints, the said means in the present embodiment of the invention comprising locking arms 26 and 27 respectively, each of which is preferably mounted on one of the rivets or fastenings of the plates 19 and 20.

Each of the said arms has its end remote from the pivotal connection shaped to form a lug or flange 28 which is intended to be moved into frictional contact with the lug or ear of the plate on the opposite side of the joint, and the said arms are intended to overlie the joints to lend rigidity to the structure and to prevent accidental disengagement of the side plates.

In a preferred construction of this device, the arms are connected by a yoke 29 making it possible to insert a tool under the yoke to move the two arms simultaneously when the arms are to be disengaged from the plates and likewise pressure or impact on the yoke will result in causing the arms to interlock with the plates when the rim sections are assembled.

As shown in the drawing, the rim has flanges at the edge which extend laterally and it has the flanges between the body of the rim and the laterally extending flanges which are here termed the "side flanges" and it is to the side flanges that the connecting and locking mechanisms preferably are applied and attached.

It has been found in practice that the presence of the side plates braced as they are by the arms results in the production of a sectional rim which can be manipulated for applying or removing tires quite expeditiously and that when the parts are set up to receive the tire, the joints will not be unlocked by vibration or other causes except those applied for intentionally releasing the joints.

I claim:

1. In a demountable rim, rim sections, the contiguous ends of each section having interlocking joints comprising plates with flanges at one end secured to the sides of a section at the joint, the said plates having beveled edges, plates attached to the sides of the contiguous end of the adjacent section having beveled edges adapted to engage the edges of the first mentioned plates, means for securing the second mentioned plates to the sides of the rim section, arms pivotally mounted at the side of the second mentioned plates and adapted to span the joint between the pairs of plates, and means on the arms for interlocking with the flanges of the first mentioned plates.

2. In a demountable rim, rim sections, the contiguous ends of each section having interlocking joints comprising plates with flanges at one end secured to the sides of a section at the joint, the said plates having beveled edges, plates attached to the sides of the contiguous end of the adjacent section having beveled edges adapted to engage the edges of the first mentioned plates, means for securing the second mentioned plates to the sides of the rim section, arms pivotally mounted at the side of the second mentioned plates and adapted to span the joint between the pairs of plates, and flanges on the arms interlocking with the flanges of the first mentioned plates.

3. In a demountable rim, rim sections, the contiguous ends of each section having interlocking joints comprising plates with flanges at one end secured to the sides of a section at the joint, the said plates having beveled edges, plates attached to the sides of the contiguous end of the adjacent section having beveled edges adapted to engage the beveled edges of the first mentioned plates, means for securing the second mentioned plates to the sides of the rim section, arms pivotally mounted at the side of the second mentioned plates and adapted to span the joint between the pairs of plates, means on the arms adapted to interlock with the flanges of the first mentioned plates, and a yoke connecting the said arms.

4. In a demountable rim, rim sections, means for connecting the contiguous ends of the rim sections together to form joints, each of said joints comprising a pair of plates on an end of one of the sections, flanges at the ends of the plates remote from the joints and plates on the sides of the contiguous section interlocking with the first mentioned plates, arms pivotally mounted at the sides of the second mentioned plates and having means for interlocking with the flanges of the first mentioned plates when the said arms are parallel with the interlocking plates.

GEORGE M. KLINELINE.